(12) United States Patent
Rosenstock et al.

(10) Patent No.: US 12,032,604 B2
(45) Date of Patent: Jul. 9, 2024

(54) LOCATION REFINEMENT

(71) Applicant: Google LLC, Mountain View, CA (US)

(72) Inventors: Jesse M. Rosenstock, New York, NY (US); Matthew T. D'Zmura, New York, NY (US)

(73) Assignee: Google LLC, Mountain View, CA (US)

( * ) Notice: Subject to any disclaimer, the term of this patent is extended or adjusted under 35 U.S.C. 154(b) by 285 days.

(21) Appl. No.: 16/193,760

(22) Filed: Nov. 16, 2018

(65) Prior Publication Data
US 2019/0087443 A1    Mar. 21, 2019

Related U.S. Application Data

(63) Continuation of application No. 14/316,569, filed on Jun. 26, 2014, now Pat. No. 10,162,838.

(60) Provisional application No. 61/840,376, filed on Jun. 27, 2013.

(51) Int. Cl.
*G06F 16/29* (2019.01)
(52) U.S. Cl.
CPC .................... *G06F 16/29* (2019.01)
(58) Field of Classification Search
CPC .... G06F 16/9537; G06F 16/29; G06F 16/444; G06F 16/638; G06F 16/245
See application file for complete search history.

(56) References Cited

U.S. PATENT DOCUMENTS

| | | | | |
|---|---|---|---|---|
| 8,433,512 | B1 * | 4/2013 | Lopatenko | G01C 21/3679 701/425 |
| 9,104,293 | B1 * | 8/2015 | Kornfeld | G06F 3/04817 |
| 9,282,161 | B1 | 3/2016 | Hill | |
| 9,563,641 | B1 | 2/2017 | Tomkins et al. | |
| 2009/0005987 | A1 | 1/2009 | Vengroff et al. | |
| 2011/0137881 | A1 | 6/2011 | Cheng et al. | |
| 2011/0238735 | A1 * | 9/2011 | Gharpure | H04L 65/403 707/802 |
| 2011/0276565 | A1 | 11/2011 | Zheng et al. | |
| 2011/0313657 | A1 * | 12/2011 | Myllymaki | G01C 21/3679 701/438 |
| 2012/0246004 | A1 * | 9/2012 | Book | G06Q 30/02 705/14.58 |
| 2013/0103697 | A1 * | 4/2013 | Hill | G06F 16/9537 707/748 |
| 2013/0103760 | A1 * | 4/2013 | Golding | H04L 67/22 709/204 |
| 2013/0117109 | A1 * | 5/2013 | Busch | G06Q 30/0255 455/456.3 |
| 2013/0262479 | A1 | 10/2013 | Liang et al. | |

(Continued)

*Primary Examiner* — Apu M Mofiz
*Assistant Examiner* — Cindy Nguyen
(74) *Attorney, Agent, or Firm* — Lerner David LLP

(57) ABSTRACT

Methods and apparatus related to associating location data with one or more entities. Location data from, for example, mobile devices carried by users, may indicate a first entity as being associated with the given location data. However, one or more affirmative user inputs may indicate that a second entity is additionally, and/or alternatively associated with location data. Accordingly, location data may be associated with the second entity. In some implementations the first entity may be dissociated from the first location data. In some implementations second location data may be identified as being associated with the first entity and the second location data may be associated with the first entity.

18 Claims, 6 Drawing Sheets

(56) References Cited

U.S. PATENT DOCUMENTS

2013/0267255 A1* 10/2013 Liu ................... H04W 4/023
　　　　　　　　　　　　　　　　　　　455/456.3
2013/0268540 A1　10/2013　van Dijk et al.

* cited by examiner

LOCATION REFINEMENT

CROSS-REFERENCE TO RELATED APPLICATIONS

This application is a continuation of U.S. application Ser. No. 14/316,569, filed on Jun. 26, 2014 which claims the benefit of the filing date of U.S. Provisional Patent Application No. 61/840,376 filed Jun. 27, 2013, all of which are incorporated herein by reference.

BACKGROUND OF THE INVENTION

Location data such as, for example, data from a user's mobile device, is often utilized to identify presence of a user at an entity. Identification of presence of a user at an entity based on location data may be utilized, for example, to provide suggestions to the user that are related to the entity.

BRIEF SUMMARY OF THE INVENTION

The present disclosure is directed generally to associating location data with an entity, and more particularly, to using one or more affirmative user inputs to associate location data with an entity. The entity may include, for example, a geographic location and/or a point of interest at the geographic location.

In some implementations, location data identified via a mobile device carried by a user may initially be associated with a first entity. For example, the location data may be associated with a first geographic location and/or a first point of interest in a database. In some implementations one or more affirmative user inputs may indicate that a second entity is additionally and/or alternatively associated with the first location data. For example, the affirmative user inputs may indicate that a second geographic location and a second point of interest should be associated with the first location data instead of or in addition to the first geographic location and first point of interest. Based at least in part on such affirmative user inputs, the first location data may be associated with the second entity. In some implementations one or more affirmative user inputs may indicate that the first entity is additionally and/or alternatively associated with second location data. Based at least in part on such affirmative user inputs, the second location data may optionally be associated with the first entity.

In some implementations, ambiguous location data of a user may be resolved based on one or signals associated with the user such as, for example, a prior search query submitted by the user. For example, location data of a user may be identified that is ambiguous (e.g., the location data may define an area that encompasses multiple entities) and one or more signals associated with that the user may be utilized to resolve the ambiguous location data (e.g., to a subset of the multiple entities encompassed by the location data). As one example, assume location data of a user is indicative of two stores—Store 1 and Store 2. Techniques disclosed herein may be utilized to resolve either Store 1 or Store 2 based on one or more signals of the user such as affirmative user inputs related to Store 1 and/or Store 2. For example, the user may have submitted a previous locational query to Store 1 and the location data may be resolved to Store 1 based at least in part on the previous locational query.

In some implementations a computer implemented method may be provided that includes the steps of: identifying first location data from one or more users at a geographic location, the first location data being identified as a potentially inaccurate identifier of the geographic location; identifying, in at least one database, at least one of a first geographic location associated with the first location data and a first point of interest associated with the first location data; determining one or more affirmative user inputs of the one or more users, the affirmative user inputs including at least one of: positive affirmative inputs correlating the first location data to at least one of the first point of interest and the first geographic location, and negative affirmative inputs correlating the first location data to at least one of a distinct point of interest and a distinct geographic location; and adjusting the association of at least one of the first geographic location and the first location data and the first point of interest and the first location data based on the one or more affirmative user inputs.

This method and other implementations of technology disclosed herein may each optionally include one or more of the following features.

In some implementations the positive affirmative inputs may include positive affirmative user inputs indicative of a likely visit to the first point of interest. In some implementations the positive affirmative inputs indicative of a likely visit to the first point of interest may include locational queries to the first point of interest. In some implementations the positive affirmative inputs indicative of a likely visit to the first point of interest may include the locational queries to the first point of interest that may be confirmed by additional actions associated with the first point of interest that may be performed by the respective users issuing the locational queries to the first point of interest. In some implementations the additional user actions associated with the first point of interest may include posts related to the first point of interest by the respective users issuing the locational queries to the first point of interest, the posts occurring after issuing the locational queries. In some implementations the additional user actions associated with the first point of interest may include at least one of Internet searches and Internet navigation related to the first point of interest by the respective users issuing the locational queries to the first point of interest. In some implementations the locational queries may be directional locational queries.

In some implementations the step of adjusting the association of at least one of the first geographic location and the first location data and the first point of interest and the first location data may include adjusting the association of the first location data and the first point of interest. In some implementations the step of adjusting the association of the first location data and the first point of interest may include adjusting a confidence level of the association of the first location data and the first point of interest.

In some implementations the negative affirmative inputs may include negative affirmative inputs associating the first location data with a second geographic location, and the step of adjusting the association of at least one of the first geographic location and the first location data and the first point of interest and the first location data may include associating the first location data with the second geographic location. In some implementations the step of adjusting the association of at least one of the first geographic location and the first location data and the first point of interest and the first location data may include dissociating the first geographic location from the first location data based on the negative affirmative inputs associating the first location data with the second geographic location.

In some implementations the first point of interest may be an identifier for a physical position in a building.

In some implementations the first point of interest may be an identifier for a geographic location in a building.

In some implementations the step of determining the one or more affirmative user inputs may include identifying a threshold number of one of the positive affirmative inputs and the negative affirmative inputs.

In some implementations the first location data may be non-GPS location data. In some implementations the first location data may be based on at least one of cellular tower signals and Wi-Fi signals.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein associate location data with an entity. Such associations represent new associations between location data and an entity and/or new aspects of such associations that may be utilized by one or more components. For example, content provided to a user may be tailored to an entity identified based on associated location data received via a device of the user.

It should be appreciated that all combinations of the foregoing concepts and additional concepts discussed in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Technology described herein may be utilized to associate location data with an entity, and more particularly, to associate location data with an entity using one or more user inputs. In some implementations identified location data may indicate that a user is at a first geographic location and/or first point of interest while one or more user inputs may indicate that the user is actually at a second geographic location and/or second point of interest. Based at least in part on such user inputs, the identified location data may be adjusted to be associated with the second entity. In some implementations the identified location data may optionally be dissociated from the first entity. In some implementations one or more user inputs may indicate that the first entity is associated with second location data and, based at least in part on such user inputs, the second location data may be associated with the first entity.

Figure 1:
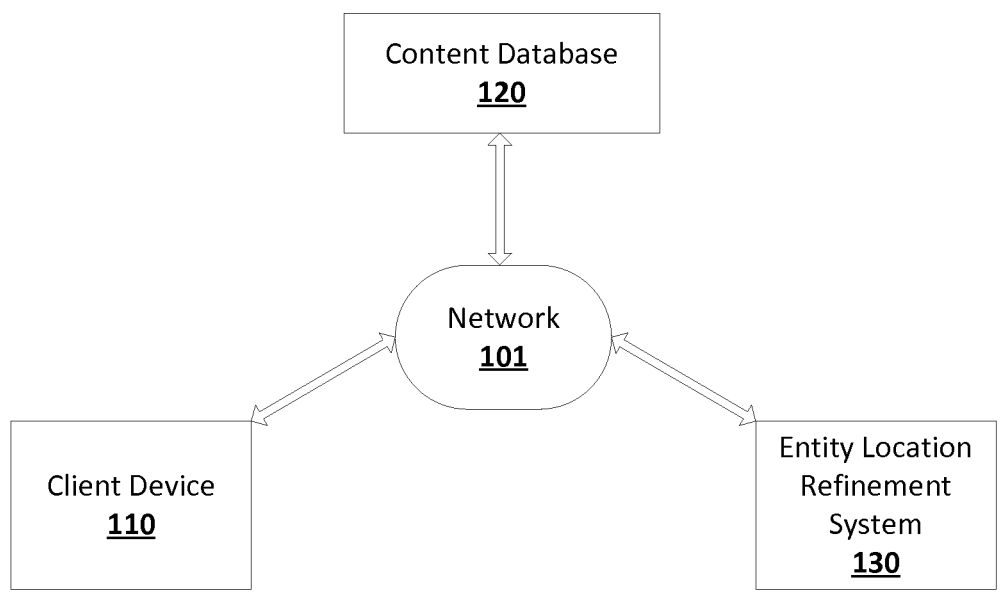
FIG. 1 is a block diagram of an example environment in which location data may be associated with an entity based on one or more affirmative user inputs.

FIG. 1 illustrates a block diagram of an example environment 100 in which location data may be associated with an entity based on one or more affirmative user inputs. The example environment 100 includes a communication network 101 that facilitates communication between the various components in the environment. In some implementations the communication network 101 may include the Internet, one or more intranets, and/or one or more bus subsystems. The communication network 101 may optionally utilize one or more standard communications technologies, protocols, and/or inter-process communication techniques. The example environment 100 also includes a client device 110, a content database 120, and a location refinement system 130. The client device 110 may be, for example, a desktop computer, a laptop, a tablet computer, a mobile phone, a tablet computing device, a computing device of a vehicle of the user (e.g., an in-vehicle communications system, an in-vehicle entertainment system, an in-vehicle navigation system), and/or a wearable apparatus of the user that includes a computing device (e.g., a watch of the user having a computing device, glasses of the user having a computing device). Additional and/or alternative computing devices of the user may be provided. In some implementations each computing device may optionally be associated with a unique identifier such as a unique IP address, a unique MAC address, etc. In some implementations one or more computing devices may have one or more identifier in common.

Figure 2:
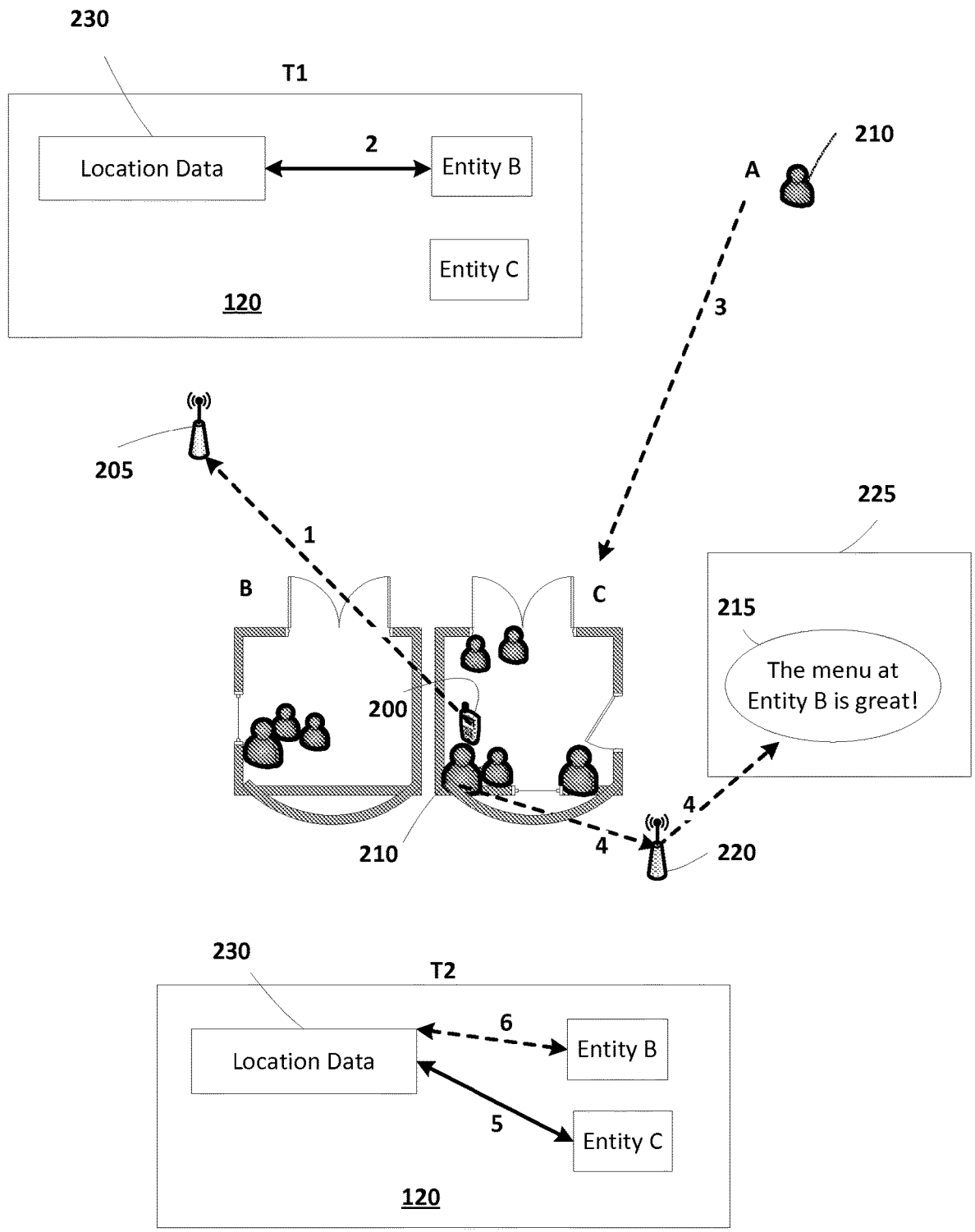
FIG. 2 is a schematic diagram that provides a general overview of an example method of associating location data with an entity based on one or more affirmative user inputs.

FIG. 2 is a schematic diagram that provides a general overview of an example method of associating location data with an entity based on one or more affirmative user inputs. Additional detailed description is provided herein. User 210 may be visiting entity C. Entity C may be associated with a point of interest and/or a geographic location. In some implementations a wireless access point 205 may identify location data for the user 210 via a mobile phone 200 of the user 210. The wireless access point 205 may be, for example, a Wi-Fi network and/or a cellular tower. The identified location data is generally indicative of a geographic location of the mobile phone 200 and may be based on signal 1 from the mobile phone 200. In some implementations the identified location data may be based on signal 1 from client device 110. In some implementations signal 1 may include GPS data from a GPS device of the client device 110. In some implementations the identified location data based on signal 1 may be location data that is a potentially inaccurate identifier of the actual geographic location of the client device 110. For example, in some implementations the identified location data may be determined based on GPS data that is of relatively low confidence. GPS data may be determined to be of relatively low confidence if less than a threshold number of GPS satellites are utilized in determining the GPS data, if the sampling time for obtaining GPS data is less than a threshold, etc. Additional and/or alternative factors may result in GPS data that is of relatively low confidence. Also, for example, in some implementations the identified location data may be determined based on Wi-Fi signals and/or cellular transmission signals and may be potentially inaccurate. For example, triangulation of the signal 1 may be performed via multiple access points and utilized as a basis for the identified location data and/or the client device 110 itself may triangulate its location based on multiple Wi-Fi, cellular, and/or other RF signals and utilize such triangulation as a basis for the identified location data. Such triangulation techniques and/or other techniques may result in identified location data that is of a relatively low confidence. The identified location data may be identified as potentially inaccurate via identification of a source of the location data and/or via an indication in the location data itself. For example, the identified location data may be indicative of multiple potential locations in a radius or other area of potential locations and/or may be provided with an indication that confidence in the determined location is relatively low. Additional and/or alternative methods of obtaining location data may be utilized such as those described herein.

In some implementations a database such as content database 120 may include a repository of associations between entities and location data. Each location data may be associated with one or more entities in the content database 120. For example, as illustrated in FIG. 2, at time T1 location data 230 has an association 2 with Entity B in the content database 120. Location refinement system 130 may access content database 120 to match the location data identified via the mobile phone 200 with a stored entry in the content database 120, such as location data 230. Exact matching and/or soft matching between the location data identified via the mobile phone 200 and the location data 230 may be utilized. For example, the location data identified via the mobile phone 200 and the location data 230 may provide an indication of the exact same location of the mobile phone 200 utilizing the exact same location data determination techniques and/or they may provide indications of similar locations and/or utilize similar location data determination techniques. The location refinement system 130 may further identify the association 2 to Entity B and identify an association between the location data 230 and a geographic location and/or point of interest of Entity B.

In some situations, the association of identified location data to an entity may not be accurate. For example, an entry in the content database 120 may indicate that the identified location data 230 is associated with Entity B. However, one or more affirmative user inputs may indicate that the identified location data should additionally and/or alternatively be associated with Entity C. For example, the content database 120 may indicate that location data 230 corresponds to a geographic location associated with Entity B, but affirmative user inputs may indicate that location data 230 should alternatively be associated with a distinct geographic location that is associated with Entity C. Such inaccuracies in the compilation of stored data may occur due to several factors. For example, as discussed herein, location data may be identified based on geolocation data, such as Wi-Fi access data, cellular tower transmission data, and so forth. Accuracy of location data may depend on the source of location data, the medium used to identify location data, and/or the efficiency of identifying location data. For example, the efficiency of identifying location data may depend on speed of identifying location data and battery usage in identifying location data. As another example, the accuracy of location data may depend on approximation errors in determining location data based on triangulation techniques and/or other techniques. Accordingly, in some implementations, one or more affirmative user inputs may be utilized individually or in combination with one another to adjust the association of location data to one or more entities. In some implementations one or more affirmative user inputs may be utilized individually or in combination with one another to increase and/or decrease the confidence level of associations between location data and entities.

In some implementations the one or more affirmative user inputs may be based on a locational query issued by the user. A locational query may include a query issued via a mapping application and/or other application that seeks location information related to an entity. For example, the user may issue a locational query of "Restaurant A" via a mapping application, such as a web-based mapping application. The mapping application may identify one or more search results for Restaurant A and provide a map to the user that displays the geographic location of one or more of the search results on the map. For example, a single search result for "Restaurant A" may be identified and an indicator of the geographic location of Restaurant A may be displayed on a map.

Locational queries may additionally and/or alternatively include directional locational queries that seek active and/or static directions to a geographic location via a mapping service. Directional locational queries may be issued by the user to one or more mapping services. For example, the user may submit a directional locational query via client device 110 that seeks directions to a geographic location. One or more mapping services may be utilized to return directions to the geographic location. Active directional locational queries seek active directions to a location. For example, a user may submit an active directional locational query by providing the address of a geographic location via a navigation device equipped with GPS and/or other locational capabilities and may receive active turn-by-turn directions to the geographic location. Static directional locational queries seek non-active directions to a location, such as via a map-based service. For example, upon searching for Restaurant A, the user may be provided with a suggested static directional locational query, such as a selectable option to "Get Directions" to Restaurant A. Upon selecting the option to receive directions to Restaurant A, the user may be provided with a map showing one or more directional paths from the user's location of choice to Location A. As referred to herein, an online "selection" of an option or a service may include, for example a mouse-click, a click-through, a voice-based selection, a selection by a user's finger on a presence-sensitive input mechanism (e.g., a touch-screen device), and/or any other appropriate selection mechanism.

For example, user 210 may issue a directional locational query 3 from location A to visit entity C and subsequently arrive at entity C. In some implementations location refinement system 130 may identify the directional locational query 3 as an affirmative user input that indicates the user 210 is likely to arrive at entity C. For example, data from an active directional locational query 3 may indicate that the user has arrived at entity C. Location refinement system 130 may identify location data from the user when the user is at location C (e.g., based on signal 1 of the mobile phone 200). Location refinement system 130 may match the identified location data with stored location data 230, and identify an existing association 2 between location data 230 and entity B. Based at least in part on the incongruence between such existing association 2 and the affirmative user input provided via directional locational query 3 (indicating the user has arrived at entity C), the location refinement system 130 may determine that such existing association 2 between location data 230 and entity B is incomplete and/or inaccurate. In some implementations the existing association 2 may be determined to be inaccurate only for an individual user that provided an affirmative user input, such as user 210. For example, based on the directional locational query 3 it may be determined that existing association 2 of the location data 230 to entity B is incorrect for the user 210 and that the location data 230 should instead be associated with entity C for the user 210 at that instance. In some implementations the existing association 2 between location data 230 and entity B may be adjusted in the content database based on one or more such affirmative user inputs. For example, association 2 between location data 230 and entity B in content database 120 may be adjusted based on the affirmative user input of the user 210. For example, location refinement system 130 may provide updated information to content database 120 to update association 2 between location data 230 and entity B in content database 120 at a first time T1 to a new association 5 between location data 230 and entity C in content database 120 at a second time T2. In some implementations location data 230 may be dissociated from entity B at the second time T2 as indicated by the dashed bi-directional arrow 6.

As another example, user 210 may choose to update her location status, access location services on a client device 110 such as her mobile phone 200, and/or post a comment 215 on a social media platform 225 using a client device 110 such as mobile phone 200 and/or another device. Comment 215 may be a comment about entity C indicating presence at entity C. For example, user 210 may post a comment 215 such as "The menu at entity C is great!". Comment 215 from user 210 may be provided to a social media platform 225 by signal 4 via a wireless access point 220 and/or other communication medium. In some implementations location refinement system 130 may identify location data from the device used to post comment 215 and associate the identified location data with entity C. Location refinement system 130 may match the identified location data with stored location data 230, and identify an existing association 2 between location data 230 and entity B. Based at least in part on the incongruence between such existing association 2 and the affirmative user input provided via comment 215, the location refinement system 130 may determine that such existing association 2 between location data 230 and entity B is incomplete and/or inaccurate. Accordingly, association 2 between location data 230 and the entity B in content database 120 may be adjusted for the user 210 and/or for multiple users based on the affirmative user input. For example, location refinement system 130 may provide the updated information to content database 120 to update the association 2 between location data 230 and the entity B in content database 120 at a first time T1 to a new association 5 between location data 230 and the entity C in content database 120 at a second time T2. In some implementations location data 230 may be dissociated from the entity B at the second time T2, as indicated by the dashed bi-directional arrow 6.

In some implementations location data may specify an assumed location in the form of latitude, longitude pair. In some implementations location data may specify an assumed location in the form a textual address, for example, "1234 Example Road, City, KY 48765" or "Example Boutique 98765". In some implementations location data may specify an assumed location in the form of multiple potential locations in a radius or other area of potential locations. For example, location data may specify a plurality of coordinates and indicate that the assumed location is within an area defined by the plurality of coordinates. Additional and/or alternative forms of location data may be utilized.

In some implementations location data may be identified based on one or more location determination systems and/or methods including indoor positioning systems that are utilized to wirelessly locate objects and/or people inside a building; differential Doppler systems; radiolocation techniques that determine location via radio waves; multilateration systems that utilize one or more radio towers in a network to physically locate a device by identifying the differences in distance to the one or more network towers; and/or trilateration and/or triangulation techniques utilized in global positioning systems. Additional and/or alternative location determination systems and/or methods may be utilized to identify the location of devices of users.

In some implementations location data for a visit to a given geographic location for a given user may include, for example, data indicative of: a date, day of the week, time, and/or time duration of actual and/or indicated visits of one or more users to the location, data related to the given and/or destination geographic location, and/or visit duration time of the visit at the given geographic location. In some implementations utilized location data may be restricted based on one or more aspects of location data. For example, location data may be restricted based on the range of dates of the visits, days of the week of the visits, and/or time of the days of the visits.

In some implementations location data may be based on at least one of cellular tower signals and Wi-Fi signals. For example, a visit to a given geographic location may be identified at least in part from cellular tower signals providing network connectivity to the mobile phone as a user visits a geographic location with the mobile phone. As another example, the user may access a Wi-Fi network at a geographic location, and this may indicate presence at the geographic location. In some implementations location data may be provided by the client device 110 at certain time intervals as a user moves with the client device 110. In some implementations any location data may not be tethered to the identity of individual users and may not be traceable to a specific user. For example, in some implementations location data associated with a given geographic location may only be accessible when at least a threshold number of users have navigated to the given geographic location. Any location data identified from a mobile phone or other electronic devices may not be identifiable to a specific user. In some implementations location data may include data that represents a summary of actual and/or indicated visits from a plurality of users.

In some implementations a given entity may be associated with given location data in at least one database. For example, the given entity may be a point of interest represented in the database by a name of a business, a textual address, a telephone number, an internet address, a unique identifier, and so forth. As another example, the given entity may be a point of interest represented by a registered name, a trademark and/or a service mark associated with the business. For example, the given entity may be represented in the database by "Example Boutique 12345" or "Kentucky Boutiques" or "Boutiques, LLC". In some implementations a database such as content database 120 may include an indexed repository of entities associated with one or more data such as location data. In some implementations location refinement system 130 may access content database 120 to identify an association between the identified location data and an entity and adjust such association.

Figure 3A:
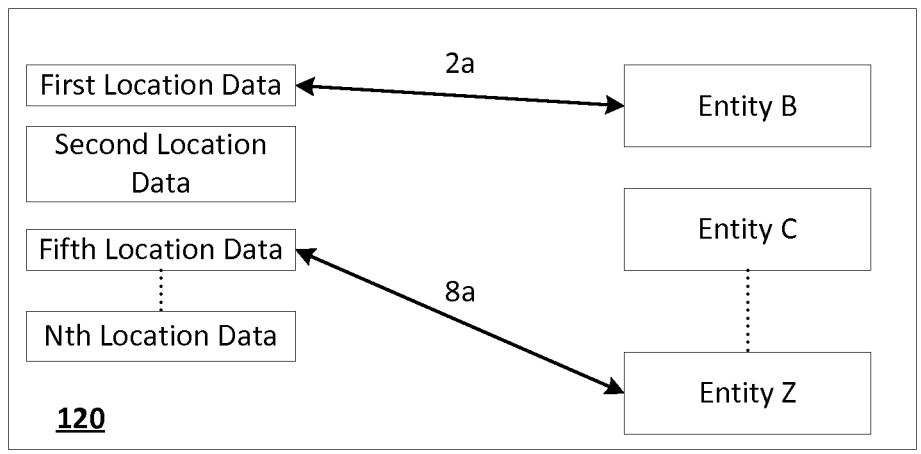
FIG. 3A schematically illustrates a portion of an example database identifying associations between location data and entities.

For example, FIG. 3A schematically illustrates a portion of an example database identifying associations between location data and entities. First location data may be identified based on client device 110 (e.g., via triangulation techniques). First location data may be associated with an entity B as indicated via arrow 2a in FIG. 3A and fifth location data may be associated with entity Z, as indicated via arrow 8a in FIG. 3A. In some implementations entity B may be an identifier for a point of interest that is a physical position in a building at a geographic location. For example, entity B may identify a particular store at a shopping mall. As another example, entity B may be a point of interest that identifies a dental practice on a particular floor of a high-rise building. As another example, entity B may identify a point of interest that is a specific portion of a store. For example, entity B may identify the particular part of a department store that displays and sells ladies' cosmetics.

One or more affirmative user inputs related to the first location data may be identified that may associate a second entity, such as for example an entity C, with the first location data. The one or more affirmative user inputs may include, for example, one or more of locational queries to the second entity (e.g. active directional locational queries, static directional locational queries), financial transactions at the second entity, user comments on a social platform related to the second entity, user selection of location services related the second entity, affirmative user responses to a query requesting affirmation of location data associated with the second entity, data from a user's search history and/or browsing history, and so forth. For example, a user may issue a directional locational query to entity C and subsequently arrive at entity C. The first location data may be received via a computing device of the user when the user is at entity C. Although the content database indicates the first location data is associated with entity B, it may be determined that the first location data should also and/or alternatively be associated with entity C for the user at that instance. For example, it may be determined that entity B and entity C are within a threshold geographical distance of one another and it may be determined that the affirmative user input of the user is sufficient to determine the user is actually at entity C and not at entity B. Accordingly, the first location data may be associated with entity C for the user at that instance instead of entity B.

Also, for example, multiple users may issue a directional locational query to entity C and subsequently arrive at entity C. The first location data may be received via computing devices of such users when the users are at entity C. Although the content database 120 indicates the first location data is associated with entity B, it may be determined that the first location data should alternatively be associated with entity C for all users. For example, it may be determined that the affirmative user inputs of the users indicating travel to entity C are consistently followed by receipt of the first location data, and that no affirmative inputs of the users indicate travel to entity B. Based on such a determination, it may be determined that the users are actually at entity C when the first location data is received and not at entity B. Accordingly, the first location data may be updated to be associated with entity C instead of entity B for all users.

In some implementations one or more of such affirmative user inputs may be combined to identify an association between an entity and location data. For example, a user may issue a directional locational query to the entity C, post a comment on a social platform related to a visit to the entity C, and may arrive at entity C. The first location data may be received from the user when the user is at entity C. Based on such multiple affirmative user inputs (the directional locational query and the post), it may be determined that the first location data should also and/or alternatively be associated with entity C for the user. For example, it may be determined that entity B and entity C are within a threshold geographical distance of one another and it may be determined that the multiple affirmative user inputs of the user are sufficient to determine the user is actually at entity C and not at entity B. Accordingly, the first location data may be associated with entity C for the user at that instance instead of entity B.

In some implementations a confidence level of association 2a between first location data and entity B may be determined based on one or more affirmative user inputs. For example, the location refinement system 130 may utilize a threshold number of affirmative user inputs related to at least one of the entity B and the first location data to confirm that association 2a between first location data and entity B is a correctly identified association. For example, multiple users may issue a directional locational query to entity B and subsequently arrive at entity B. The first location data may be received from the users when the users are at entity B. It may be determined that the association 2a between the first location data and entity B is a correctly identified association based on the multiple affirmative user inputs indicating the users were planning to travel to entity B, followed by receipt of the first location data via computing devices of the users. Also, for example, the location refinement system 130 may utilize an affirmative user input from an individual user related to at least one of the first location data and entity B to confirm that association 2a is a correctly identified association for that individual user. For example, a user may issue a directional locational query to entity B and subsequently arrive at entity B. The first location data may be received from the user when the user is at entity B. It may be determined that the association 2a between the first location data and entity B is a correctly identified association for the user at that instance based on the affirmative user input indicating the user was planning to travel to entity B. As another example, location refinement system 130 may utilize a threshold number of affirmative user inputs related to at least one of the entity B and the first location data to increase the confidence level of association 2a between first location data and entity B. Also, as another example, location refinement system 130 may utilize an affirmative user input from an individual user to increase the confidence level of association 2a between first location data and entity B for that individual user.

In some implementations a confidence level may be associated with one or more of the affirmative user inputs in determining the weight to accord such affirmative user inputs in adjusting the association between an entity and location data (e.g., in increasing a confidence level of an existing association, in creating an association between the location data and a new entity, and/or in removing an association between an entity and location data). For example, affirmative user inputs based on an issued static directional locational query that indicate an association between an entity and location data may be associated with a confidence level less indicative of confidence than an association between the entity and the location data that is based on an issued static directional locational query combined with an issued active directional locational query; which may, in turn be associated with a confidence level less indicative of confidence than an association between the entity and the location data that is based on an issued static directional locational query, in combination with an issued active directional locational query and a post by the user related to the entity while the user is at the entity.

As another example, an existing association 2a between identified location data 230 and entity B may indicate that user is at entity B while one or more affirmative user inputs related to the first location data may indicate that user is at entity C. For example, with reference to FIG. 2, two entities B and C may be in close physical proximity to each other, such as adjacent stores in a mall. For example, entity B may be identified as "Anonymous Nails and Spa" and entity C may be identified as "Healthy and Nutritious Living". One or more affirmative user inputs may identify entity C as being associated with location data 230. For example, a user may issue a locational query for "Healthy and Nutritious Living", subsequently arrive at entity C, and location data 230 may be identified via a mobile device and/or other client device 110 of the user while at entity C. Accordingly, the user, via the locational query, has affirmatively identified entity C ("Healthy and Nutritious Living") as being the entity that should be associated with location data 230. A database, such as content database 120 may store data on an existing association 2 between identified location data 230 and entity C. Accordingly, association 2 between location data 230 and the entity B in content database 120 may be adjusted based on the one or more affirmative user inputs to reflect a new association between identified location data 230 and entity C.

As another example, again with reference to FIG. 2, one or more identifiers associated with entity B may change over time. For example, the alias associated with a business identified as entity B in a database such as content database 120 may change. For example, entity B may be replaced by a second business, entity C. In such a situation, an existing association 2 between identified location data 230 and entity B in content database 120 may incorrectly indicate that user is at entity B whereas one or more affirmative user inputs may indicate that the user is at entity C. Accordingly, association 2 between location data 230 and the entity B in content database 120 may be adjusted based on the one or more affirmative user inputs to reflect a new association between identified location data 230 and entity C.

Figure 3B:
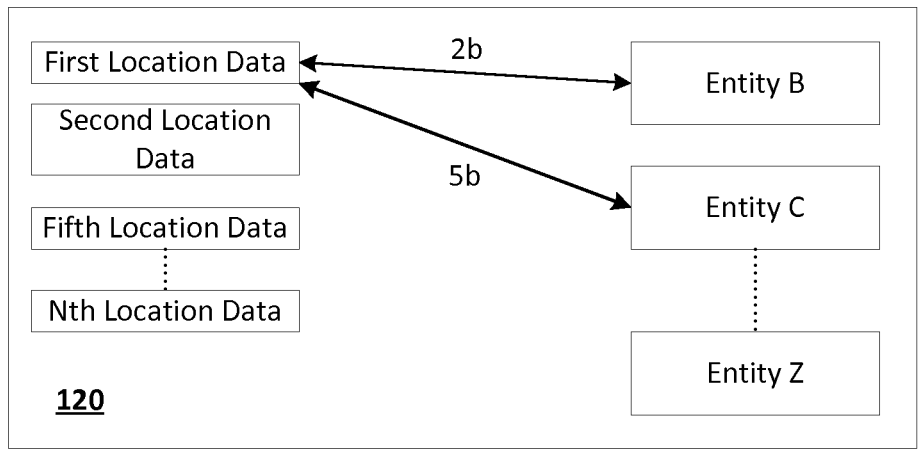
FIG. 3B schematically illustrates a portion of another example database identifying associations between location data and entities.

FIG. 3B schematically illustrates a portion of another example database identifying associations between location data and entities. First location data may be identified based on client device 110. An existing association 2b between first location data and entity B may indicate that the user is at entity B. One or more affirmative user inputs related to the first location data may additionally indicate that the user is at entity C. Location refinement system 130 may provide such updated information to content database 120 based on the one or more affirmative user inputs to add a new association 5b between first location data and entity C in content database 120. In some implementations first location data may continue to be associated with entity B via association 2b. For example, location refinement system 130 may determine that association 2b is a correctly identified association based on additional affirmative user inputs of other users indicating association 2b is a correct association. As illustrated in this example, location data may be associated with one or more entities. For example, the entities may be indicative of points of interest and both points of interest may be at the same geographic location. Also, for example, the entities may be indicative of geographic locations and the first location data may be indicative of both geographic locations.

Figure 3C:
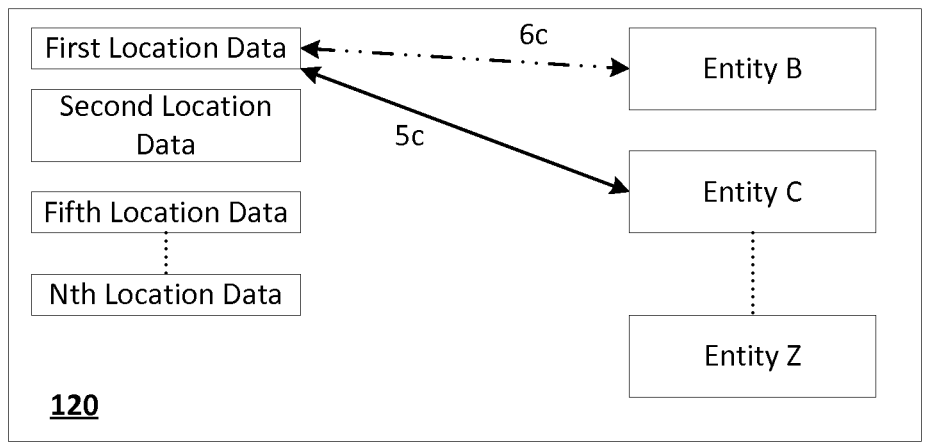
FIG. 3C schematically illustrates a portion of another example database identifying associations between location data and entities.

FIG. 3C schematically illustrates a portion of another example database identifying associations between location data and entities. First location data may be identified based on client device 110. An existing association 2a between first location data and entity B, as illustrated in FIG. 3A, may indicate that the user is at entity B. For example, entity B may be a first geographic location. One or more affirmative user inputs related to the first location data may alternatively indicate that the user is at entity C. For example, entity C may be a second geographic location. Location refinement system 130 may provide such updated information to content database 120 based on the one or more affirmative user inputs to adjust the existing association between first location data and entity B in content database 120 to dissociate first location data from the entity B as indicated by the dashed bi-directional arrow 6c. For example, location refinement system 130 may determine that the existing association is not a correctly identified association based on a determination of a decreased confidence level of the existing association as a result of the affirmative user inputs associating the first location with entity C. Additionally and/or alternatively, location refinement system 130 may provide information to content database 120 to add new association 5c between first location data and entity C in content database 120 based on the one or more affirmative user inputs. Accordingly, a database entry for first location data that associates the first location data with a first geographic location may be updated to reflect a new association with a second geographic location.

Figure 3D:
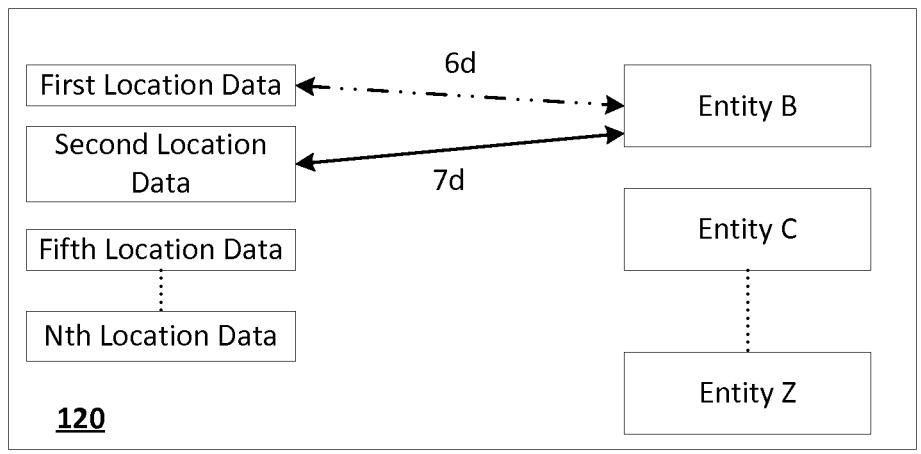
FIG. 3D schematically illustrates a portion of another example database identifying associations between location data and entities.

FIG. 3D schematically illustrates a portion of another example database identifying associations between location data and entities. Second location data may be identified based on client device 110. An existing association 2a between first location data and entity B, as illustrated in FIG. 3A, may indicate that the first location data is related to entity B. One or more affirmative user inputs may indicate that entity B should alternatively be associated with the second location data. For example, entity B may be a geographic location and the affirmative user inputs may include directional locational queries to that geographic location, followed by receipt of the second location data. Based on such affirmative user inputs it may be determined that second location should be associated with entity B. One or more affirmative user inputs may also indicate that entity B should not be associated with the first location data. For example, entity B may be a geographic location and the affirmative user inputs may include directional locational queries to a distinct geographic location, followed by receipt of the first location data. In some implementations location refinement system 130 may provide the updated information based on the one or more affirmative user inputs to content database 120 to add a new association 7d between second location data and entity B in content database 120 and to remove an existing association 6d between the first location data and entity B.

Figure 3E:
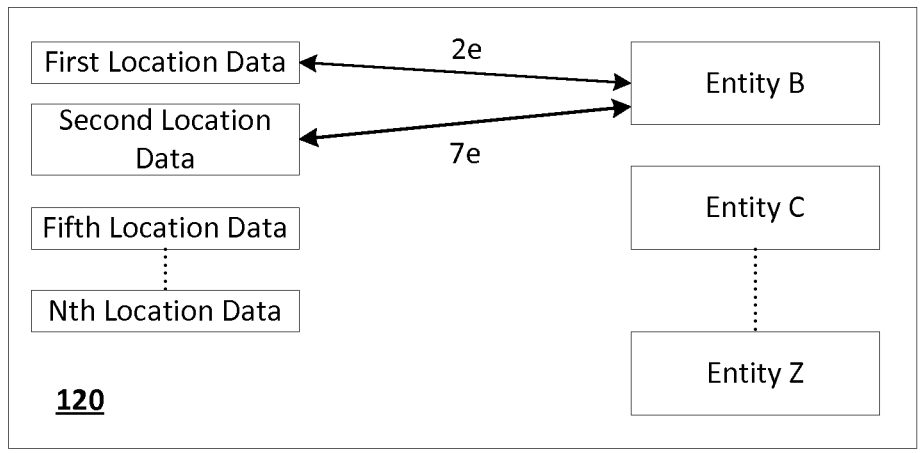
FIG. 3E schematically illustrates a portion of another example database identifying associations between location data and entities.

FIG. 3E schematically illustrates a portion of another example database identifying associations between location data and entities. Second location data may be identified based on client device 110. An existing association 2e between first location data and entity B, as illustrated in FIG. 3A, may indicate that the first location data is related to entity B. One or more affirmative user inputs may indicate that entity B should also be associated with the second location data. For example, entity B may be a point of interest and the affirmative user inputs may include directional locational queries to that point of interest, followed by receipt of the second location data. Based on such affirmative user inputs it may be determined that second location data is also associated with entity B. In some implementations location refinement system 130 may provide the updated information based on the one or more affirmative user inputs to content database 120 to add a new association 7d between second location data and entity B in content database 120. As illustrated in this example, two or more location data may be associated with a single entity. The single entity may be representative of a single business and/or a single geographic location. For example, in some implementations the first location data and the second location data may both map to the same geographic location. For example, it may be the case that the first location data is based on input from cell tower signals only and the second location data is based on input from cell tower signals and Wi-Fi signals. The first location data and the second location data may represent different data, but both be mapped to the same entity B.

Figure 3F:
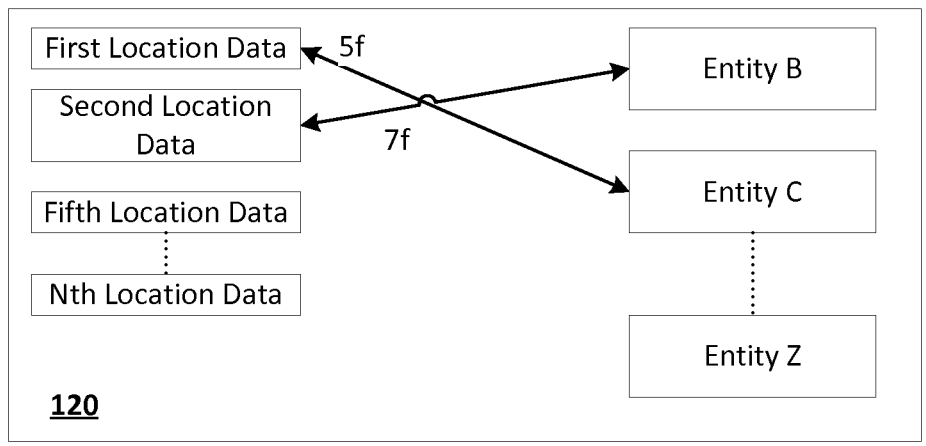
FIG. 3F schematically illustrates a portion of another example database identifying associations between location data and entities.

FIG. 3F schematically illustrates a portion of another example database identifying associations between location data and entities. First location data may be identified based on client device 110. An existing association 2a between first location data and entity B, as illustrated in FIG. 3A, may indicate that user is at entity B while one or more affirmative user inputs related to the first location data may associate first location data with entity C. Additionally, one or more affirmative user inputs related to second location data may associate entity B with the second location data. In some implementations location refinement system 130 may provide the updated information based on the one or more affirmative user inputs to content database 120 to add a new association 7f between the second location data and entity B in content database 120. Additionally, and/or alternatively, location refinement system 130 may provide the updated information based on the one or more affirmative user inputs to content database 120 to add a new association 5f between the first location data and the entity C in content database 120.

In some implementations one or more databases, such as content database 120, may index data related to one or more users. In such situations location refinement system 130 may adjust the associations of location data and entities for the one or more users. For example, a database in one or more client devices 110 may be updated. Additionally and/or alternatively the database, such as content database 120, may index data related to one or more users or groups of users. In such situations location refinement system 130 may adjust the associations of location data and entities for the one or more users.

In some implementations identifying one or more affirmative user inputs associating an entity with location data may include identifying a locational query of a user to the entity and/or identifying arrival of the user at the entity after the locational query. For example, a user may issue a directional locational query to a geographic location on a client device 110. One or more mapping services may be utilized to return directions to the geographic location. Location data from the user may be indicative of presence of the user near the geographic location after issuing the locational query and the affirmative user inputs utilized to associate the location data with the geographic location. As another example, the affirmative user input may include data based on an active directional locational query to the entity based on a navigation device. In some implementations the navigation device providing active navigation to the entity may be distinct from the computing device from which location data is received. For example, a first computing device may provide active navigation to the entity utilizing GPS and arrival at the entity may be confirmed based on such GPS data. Location data may be received via a separate computing device of the user after arriving at the entity and an entity associated with the received location data compared to entity indicated by the active directional locational query and the first computing device. When the entity associated with the location data and the entity indicated by the active directional locational query and the first computing device conform to one another, it may be indicative of a correct association between the entity and the location data. However, when the entity associated with the location data and the entity indicated by the active directional locational query and the first computing device do not conform to one another, it may be indicative of an incorrect or incomplete association of entities with the location data. In some implementations a record of active directional locational queries may be stored in a database such as the content database 120 that includes the source geographic locations of the active directional locational queries and/or the destination geographic locations of the active directional locational queries.

In some implementations identifying arrival of the user at an entity after the locational query may be based on one or more additional affirmative user inputs discussed herein, such as posts related to the entity, searches related to the entity, etc. In some implementations identifying arrival of the user at an entity after the locational query may be based on at least one of cellular tower signals and Wi-Fi signals that result in location data indicative of presence near the entity. For example, location refinement system 130 identify a visit to a geographic location near an entity from cellular tower signals providing network connectivity to a client device 110 as a user visits the entity with the client device 110. As another example, client device 110 may access a Wi-Fi network at or near the entity, and this may indicate presence at the entity. In some implementations location data may be provided by a client device 110 at certain time intervals as a user moves with the client device 110.

In some implementations identifying one or more affirmative user inputs associating an entity with location data may include identifying a threshold number of locational queries of a plurality of users to the entity. For example, identifying one or more affirmative user inputs may be based on the directional locational queries of a plurality of users that indicate travel of at least a threshold number and/or percentage of users to the entity. For example, identifying one or more affirmative user inputs associating an entity with location data may be based on the number and/or percentage of users that provide further affirmative user inputs indicative of going to the entity after issuing the directional locational query. Also, for example, the identification may be based on affirmative user inputs of a plurality of users that indicates at least a threshold number of users issued the directional locational query. For example, in some implementations a threshold number of users may be at least a threshold percentage of users issuing the directional locational query.

In some implementations the threshold may be a fixed threshold. In some implementations the threshold may be based on the type of the entity (e.g., venue, restaurant, retail store) to which the affirmative user inputs relate. In some implementations the threshold may be based on location data and/or the affirmative user inputs. For example, statistical analysis may be performed on location data and/or the affirmative user inputs for one or more users visiting an entity to determine a statistically significant threshold.

In some implementations identifying one or more affirmative user inputs associating an entity with location data may include identifying a threshold number of posts related to the entity by users. For example, data from a user's social network profile may be utilized to verify that the user went to the entity. In some implementations the posts may be issued by the user while the user is at the entity, and/or may be issued after the user visits the entity. For example, the user may be at the entity and post a comment related to the entity. For example, the user may be at the entity, location data received via a computing device of the user while at the entity, and a post concerning the entity made by the user while at the entity. The received location data may be associated with the post that concerned the entity and such an association utilized to confirm an existing association between the entity and the received location data and/or create a new association between the entity and the received location data. As another example, the user may post a comment related to the entity after leaving the entity.

In some implementations, content of the posts may be utilized to relate the posts to received location data. For example, a post may be identified as related to received location data if content of the post relates to an entity within a threshold geographic distance of a geographic location associated with the received location data. Also, for example, a post may be identified as related to received location data if content of the post relates to an entity identified in a locational query received prior to receipt of the location data. Also, for example, a plurality of similar posts (e.g., all referencing the same entity) from different users may be identified as related to received location data from those users if the location data was received from all of the users within a threshold time period of submitting the respective posts. In other words, a corpus of similar posts from a group of users that can be mapped to the same location data being received via those users within a threshold time period of submitting the respective posts may indicate a correlation between the posts and the received location data. In some implementations, a time threshold and/or intervening posts may be utilized to identify posts that may be related to received location data. For example, for received location data a time threshold of one hour from the receipt of the location data may be utilized to identify posts that may be related to the received location data. As another example, the user may visit a dining establishment on a first day, resulting in first location data, and then visit a breakfast place the next morning, resulting in second location data. A post that is posted between the receipt of the first location data and the second location data that concerns a dining experience without specifically identifying the entity may be related to the dining establishment. However, a post that is posted after the visit to the breakfast place that concerns a dining experience without specifically identifying the entity may, in some implementations, be related to the breakfast place instead of the dining establishment.

In some implementations the posts related to the entity by users may include check-ins to the entity. The term "check-in", as used herein, includes a user-approved and/or user-initiated indication of a visit to a geographic location. For example, a user at a Location A may be provided, via a mobile computing device, with an option to verify that the user is at Location A. For example, the option to verify may be in the form of a prompt provided to the user, such as, for example, "Would you like to check-in to your current location?" along with a list of selectable options including "Location A", "Location B", and "Location C". The user may select "Location A" in response to the prompt to check-in to Location A. Also, for example, a user may choose to automatically check-in to one or more locations visited by the user. For example, location data may indicate that the user is at Location A, and the user, via a mobile computing device, may automatically check-in to Location A. Additional and/or alternative techniques to check-in to a geographic location may be utilized. For example, the user may check-in to the entity via a social network, and/or may post a comment related to the entity on a social media platform. As another example, a user may choose to subscribe to one or more location services provided via the client device 110 to receive information and updates related to locations of interest to the user. For example, a user may subscribe to a location service that offers discount coupons to entities and location data may indicate that user went to the entities and used the coupons. In such an instance, the location refinement system 130 may identify the affirmative user inputs from the one or more location services. As another example, a user may affirmatively select the identity of the entity from a list of entities provided to the user by the one or more location services.

In some implementations identifying one or more affirmative user inputs associating an entity with location data may include identifying data from a user's search history and/or browsing history. For example, the user may issue a search related to the entity, read reviews for the entity, and/or view an online restaurant menu when the entity is a restaurant. Such affirmative user actions may indicate that the user will actually travel to the entity. Moreover, such affirmative user inputs may be related to received location data. For example, a user's search related to an entity may be identified as related to received location data from the user if the received location data relates to a geographic location within a threshold geographic distance of a geographic location associated with the entity of the search. Also, for example, a user's search related to an entity may be identified as related to received location data if the entity is that same as an entity identified in a locational query received prior to receipt of the location data. Also, for example, a plurality of similar searches (e.g., all referencing the same entity) from different users may be identified as related to received location data from those users if the location data was received from all of the users within a threshold time period of submitting the respective searches. In other words, a corpus of similar searches from a group of users that can be mapped to the same location data being received via those users within a threshold time period of submitting the respective searches may indicate a correlation between the searches and the received location data. In some implementations, a time threshold and/or intervening searches and/or browsing may be utilized to identify searches and/or browsing history that may be related to received location data.

In some implementations identifying one or more affirmative user inputs associating an entity with location data may include identifying affirmative user responses to a query requesting affirmation of associations of an entity with previously received location data of the users. A query may be sent to a user at the time the location data is received and/or after the location data is received. For example, after location data associated with entity C is received for a user, location refinement system 130 may send a query to the user via a client device 110 of the user, such as a mobile device. The query may be "Are you at entity C?". The user may respond affirmatively by confirming that user is at entity C. In some implementations the query may be, for example, "Are you at entity C?" and the user may select "No" in response. In some implementations the query may be in the form of selecting one or more entities from a list of entities. For example, the query may be "Choose your current location" and the user may be provided a list including "Location A", "Entity B", and "Entity C" as selectable options. The user may select "Entity C" in response. In some implementations the list provided may further include an additional option such as "Other", and allow the user to input an alternative entity. For example, upon selection of "Other", the user may be provided with a user-editable field and prompted to enter the name of the current entity being visited by the user.

In some implementations location data stored in one or more databases such as content database 120 may be utilized in updating the association between the identified location data and an entity. For example, content database 120 may include location data for each of one or more geographic locations. For example, content database 120 may include location data that is associated with a geographic location. The information about the geographic location may include an identifier of the geographic location such as an address, a latitude and longitude, a zip code, a neighborhood, and/or other identifier. In this specification, the term "database" will be used broadly to refer to any collection of data. The data of the database does not need to be structured in any particular way, or structured at all, and it can be stored on storage devices in one or more geographic locations. Thus, for example, the content database 120 may include multiple collections of data, each of which may be organized and accessed differently.

In situations in which the systems discussed herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personally identifiable information is removed. For example, a user's identity may be treated so that no personally identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

The content database 120, and/or the location refinement system 130 may be implemented in hardware, firmware, and/or software running on hardware. For example, one or more of the systems may be implemented in one or more computer servers.

Many other configurations are possible having more or fewer components than the environment shown in FIG. 1. For example, in some environments the location refinement system 130 may comprise multiple individual systems.

Figure 4:
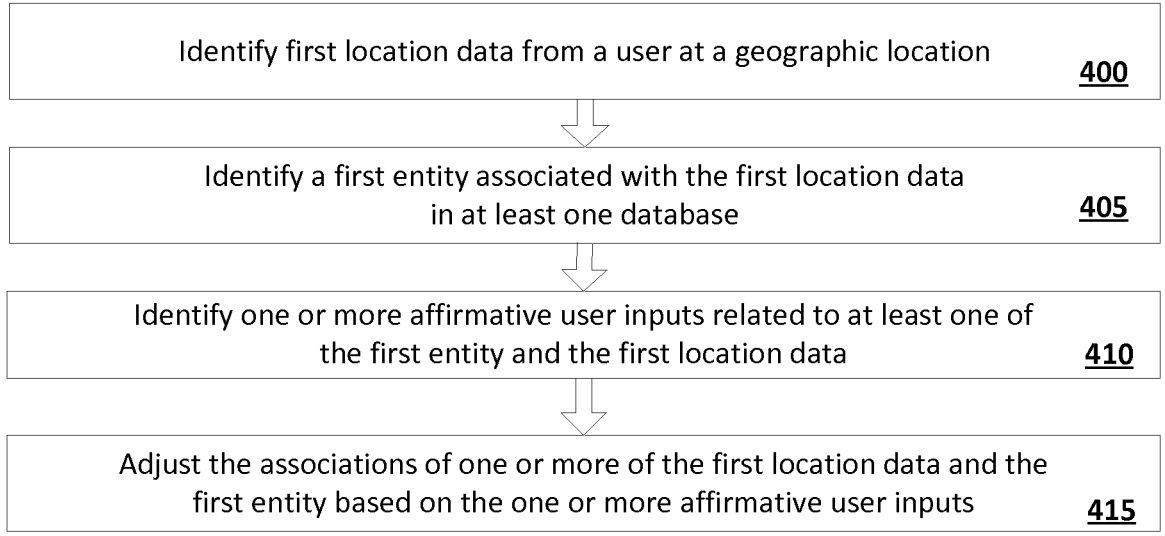
FIG. 4 is a flow chart illustrating an example method of adjusting the associations of one or more of location data and an entity based on one or more affirmative user inputs.

Referring to FIG. 4, a flow chart illustrates an example method of associating location data with an entity based on one or more affirmative user inputs. Other implementations may perform the steps in a different order, omit certain steps, and/or perform different and/or additional steps than those illustrated in FIG. 4. For convenience, aspects of FIG. 4 will be described with reference to a system of one or more components that perform the process. The system may include, for example, the location refinement system 130 of FIG. 1.

At step 400, first location data is identified from a user at a geographic location. The first location data is indicative of the physical location of the user. In some implementations the first location data may be identified and/or provided based on an electronic device of the user. For example, a cellular transmission tower and/or a Wi-Fi hub may be utilized to identify location data for a client device 110 carried by the user to content database 120.

At step 405, a first entity associated with the first location data is identified in at least one database. In some implementations location refinement system 130 may identify the first location data and access a database (e.g. content database 120) to identify a first entity associated with the first location data. In some implementations the first entity may be associated with an identifier for a geographic location. For example, the first entity may be identified as "1234 Unknown Street, Generic Town, KY—400xx". In some implementations the first entity may be associated with an identifier for a business, including one or more of a business name, a business alias, legal name, and a trade name. For example, the first entity may be identified as "Anonymous Nails and Spa". In some implementations the first entity may be an identifier for a physical position in a building at a geographic location. For example, the first entity may be identified as "Anonymous Nails and Spa in Shopping Mall".

At step 410, one or more affirmative user inputs related to at least one of the first entity and the first location data are identified. In some implementations identifying the one or more affirmative user inputs related to at least one of the first entity and the first location data may include identifying affirmative user inputs indicative of a likely visit to a second entity. For example, a locational query of a user to the second entity and/or identifying arrival of the user at the second entity after the locational query may be identified. In some implementations identifying arrival of the user at the second entity after the locational query may be based on geolocation data from a device of the user at the second entity, financial transactions at the second entity, user comments on a social platform related to the second entity, user selection of location services related to and/or at the second entity, affirmative user responses to a query requesting affirmation of location data associated with the second entity, data from a user's search history and/or browsing history, and so forth.

At step 415, the associations of one or more of the first location data and the first entity may be adjusted based on the one or more affirmative user inputs. For example, the location refinement system 130 may utilize a threshold number of affirmative user inputs related to at least one of the first entity and the first location data to confirm that an identified association between first location data and the first entity is a correctly identified association. As another example, location refinement system 130 may utilize a threshold number of affirmative user inputs related to at least one of the first entity and the first location data to increase the confidence level of the identified association between first location data and the first entity.

In some implementations an existing association between first location data and the first entity may indicate that user is at the first entity while the one or more affirmative user inputs related to at least one of the first entity and the first location data may indicate that user is at a second entity when the first location data is received. A database, such as content database 120 may store data on an existing association between the first location data and the first entity. The location refinement system 130 may identify one or more affirmative user inputs related to the first location data that indicate that user is at a second entity and, based on such affirmative user inputs, may determine that such an existing association is incomplete and/or incorrect. Accordingly, location refinement system 130 may update content database 120 to add a new association between the first location data and the second entity and/or to dissociate first location data from the first entity. In some implementations location refinement system 130 may additionally and/or alternatively increase or decrease a confidence level associated with the existing association between first location data and the first entity in content database 120.

Figure 5:
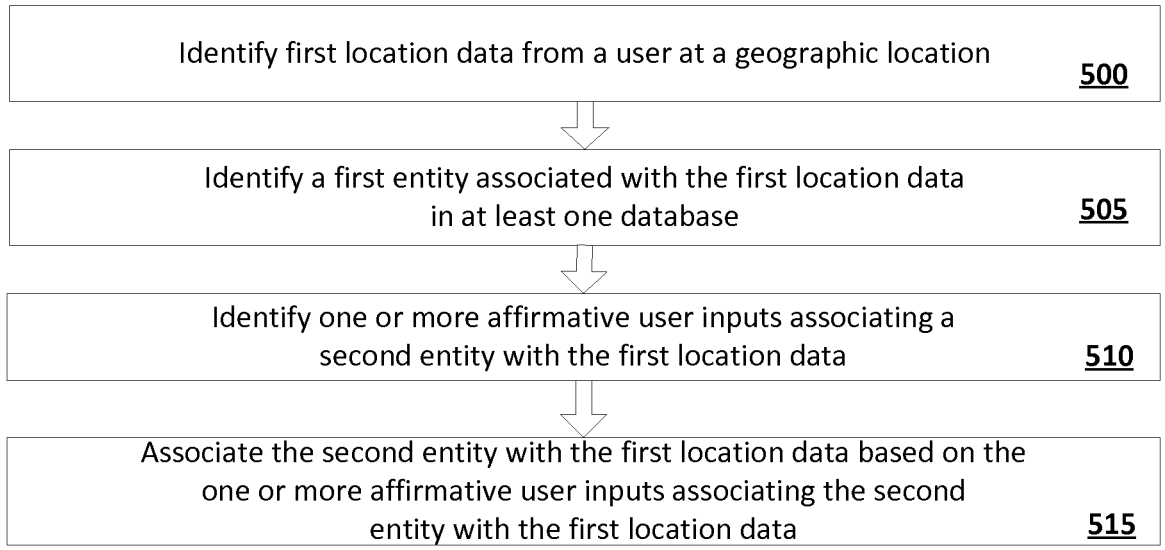
FIG. 5 is a flow chart illustrating an example method of associating location data with an entity based on one or more affirmative user inputs.

Referring to FIG. 5, a flow chart illustrates an example method of associating an entity with location data based on one or more affirmative user inputs. Other implementations may perform the steps in a different order, omit certain steps, and/or perform different and/or additional steps than those illustrated in FIG. 5. For convenience, aspects of FIG. 5 will be described with reference to a system of one or more components that perform the process. The system may include, for example, the location refinement system 130 of FIG. 1.

At step 500, first location data is identified from a user at a geographic location. The first location data is indicative of the physical location of the user. In some implementations location data may be identified based on one or more location determination systems and/or methods such as those described herein. Step 500 may share one or more aspects in common with step 400 in FIG. 4.

At step 505, a first entity associated with the first location data is identified in at least one database. In some implementations location refinement system 130 may identify the first location data and access a database (e.g. content database 120) to identify a first entity associated with the first location data. In some implementations the first entity may be associated with an identifier for a geographic location. In some implementations the first entity may be associated with an identifier for a business, including one or more of a business name, a business alias, legal name, and a trade name. Step 505 may share one or more aspects in common with step 405 in FIG. 4.

At step 510, one or more affirmative user inputs associating a second entity with the first location data are identified. In some implementations identifying the one or more affirmative user inputs related to the first location data may include identifying affirmative responses by a user to a query requesting affirmation of the first location data. For example, location refinement system 130 may send a query to the user via a client device 110 of the user, such as a mobile device. The query may state, for example, "Are you at the second entity?" User may respond affirmatively by confirming that user is at the second entity. In some implementations the query may be in the form of selecting one or more entities from a list of entities. For example, the query may state "Choose your current location" and the user may be provided a list including "First Location", "First Entity", and "Second Entity" as selectable options. User may select "Second Entity" in response. In some implementations the list provided may further include an additional option such as "Other", and allow the user to input an alternative entity. For example, upon selection of "Other", the user may be provided with a user-editable field and prompted to enter the name of the current entity being visited by the user. Step 510 may share one or more aspects in common with step 410 in FIG. 4.

At step 515, the second entity may be associated with the first location data based on the one or more affirmative user inputs associating the second entity with the first location data. An existing association between first location data and the first entity may indicate that the user is at the first entity. One or more affirmative user inputs related to at least one of the first entity and the first location data, and/or a threshold number of affirmative user inputs related to at least one of the first entity and the first location data may additionally and/or alternatively indicate that the user is at the second entity. Location refinement system 130 may provide such updated information to content database 120 based on the one or more affirmative user inputs to adjust the existing association between first location data and the first entity in content database 120 to add a new association between the first location data and the second entity in content database 120. In some implementations the first location data may continue to be associated with the first entity. For example, location refinement system 130 may determine that the existing association is a correctly identified association based on a determination of an increased confidence level of the existing association.

Figure 6:
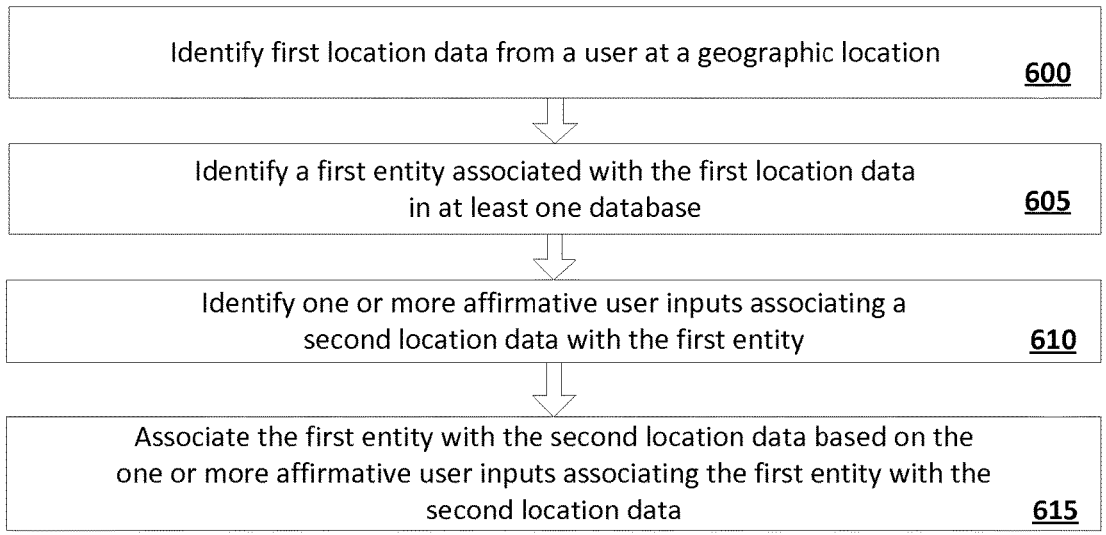
FIG. 6 is a flow chart illustrating another example method of associating location data with an entity based on one or more affirmative user inputs.

Referring to FIG. 6, a flow chart illustrates an example method of associating an entity with location data based on one or more affirmative user inputs. Other implementations may perform the steps in a different order, omit certain steps, and/or perform different and/or additional steps than those illustrated in FIG. 6. For convenience, aspects of FIG. 6 will be described with reference to a system of one or more components that perform the process. The system may include, for example, the location refinement system 130 of FIG. 1.

At step 600, first location data is identified from a user at a geographic location. The first location data is indicative of the physical location of the user. In some implementations location data may be identified based on one or more location determination systems and/or methods such as those described herein. Step 600 may share one or more aspects in common with step 400 in FIG. 4 and/or step 500 in FIG. 5.

At step 605, a first entity associated with the first location data is identified in at least one database. In some implementations location refinement system 130 may identify first location data and access a database (e.g. content database 120) to identify a first entity associated with the first location data. In some implementations the first entity may be an identifier for a geographic location. In some implementations the first entity may be an identifier for a business, including one or more of a business name, a business alias, legal name, and a trade name. Step 605 may share one or more aspects in common with step 405 in FIG. 4 and/or step 505 in FIG. 5.

At step 610, one or more affirmative user inputs associating the first entity with second location data may be identified. The one or more affirmative user inputs may be one or more of locational queries to the second entity, geolocation data from client devices 110 at the second entity, financial transactions at the second entity, user comments on a social platform related to the second entity, user selection of location services related to and/or at the second entity, affirmative user responses to a query requesting affirmation of location data associated with the second entity, data from a user's search history and/or browsing history, and so forth. The second location data may be identified based on client device 110, for example, it may be determined via triangulation techniques. The second location data may be mapped to the one or more affirmative user inputs utilizing one or more techniques such as those discussed herein.

As an example, the affirmative user inputs may be directional locational queries of users to the first entity and such affirmative user inputs may be mapped to the second location data based on receipt of the second location data via the users after issuing the directional locational queries. Step 610 may share one or more aspects in common with step 410 in FIG. 4 and/or step 510 in FIG. 5.

At step 615, the first entity may be associated with the second location data based on the one or more affirmative user inputs associating the first entity with the second location data. For example, an existing association between first location data and the first entity may indicate that user is at the first entity while one or more affirmative user inputs may associate the first entity with the second location data. In some implementations location refinement system 130 may provide the updated information based on the one or more affirmative user inputs to content database 120 to dissociate first location data from the first entity. For example, location refinement system 130 may determine that the existing association is not a correctly identified association based on a determination of a decreased confidence level of the existing association. Additionally and/or alternatively, location refinement system 130 may provide information to content database 120 to add a new association between the second location data and the first entity in content database 120.

Figure 7:
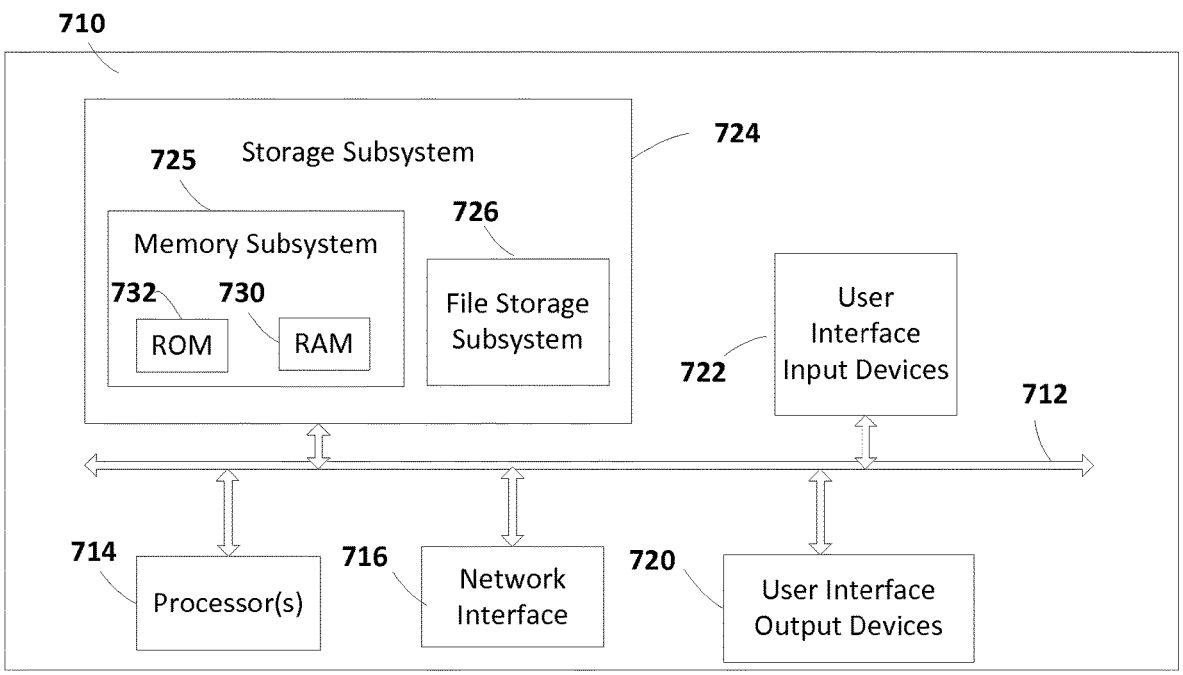
FIG. 7 illustrates a block diagram of an example computer system.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory subsystem 726 and a file storage subsystem 728, user interface input devices 722, user interface output devices 720, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to associate location data with an entity at a geographic location based on one or more affirmative user inputs.

These software modules are generally executed by processor 714 alone or in combination with other processors. Memory 726 used in the storage subsystem can include a number of memories including a main random access memory (RAM) 730 for storage of instructions and data during program execution and a read only memory (ROM) 732 in which fixed instructions are stored. A file storage subsystem 728 can provide persistent storage for program and data files, and may include a hard disk drive, a floppy disk drive along with associated removable media, a CD-ROM drive, an optical drive, or removable media cartridges. The modules implementing the functionality of certain implementations may be optionally stored by file storage subsystem 728 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

As used herein in the specification and in the claims, the term "database" will be used broadly to refer to any collection of data. The data of the database does not need to be structured in any particular way, or structured at all, and it can be stored on storage devices in one or more geographic locations. It should also be understood that, unless clearly indicated to the contrary, in any methods claimed herein that include more than one step or act, the order of the steps or acts of the method is not necessarily limited to the order in which the steps or acts of the method are recited.

The invention claimed is:

1. A method comprising:
receiving, from a mobile device, first location data associated with an indicated geographic location of the mobile device;
identifying, using one or more processors, in at least one database a first association between a first point of interest (POI) and the first location data;
when a user input correlates the first POI with the indicated geographic location, confirming, using the one or more processors, the first association between the first POI and the first location data as a correctly identified association;
when the user input correlates the first POI with second location data distinct from the first location data, adding in the at least one database a second association between the first POI and the second location data, the first location data and the second location data are based on two different sources;
receiving a request from a user for information relating to the location of the first POI; and
providing for display to the user, using the one or more processors and based on the confirmation or the addition, the first POI on a map.

2. The method of claim 1, wherein the user input is indicative of a likely visit to the first POI.

3. The method of claim 2, wherein the user input comprises a directional locational query to the first POI.

4. The method of claim 3, wherein the user input is received from a user of the mobile device and further comprises confirmation by an additional user action associated with the first POI.

5. The method of claim 4, wherein the additional user action associated with the first POI includes a post related to the first POI, the post occurring after the directional locational query.

6. The method of claim 4, wherein the additional user action associated with the first POI includes at least one of an Internet search or an Internet navigation event related to the first POI.

7. The method of claim 1, wherein the first POI is an identifier for a physical position in a building.

8. The method of claim 1, wherein the method further comprises providing a user at a geographic location with an option to verify that the user is at the geographic location.

9. The method of claim 8, wherein the method further comprises providing the user with a list of selectable options, the list including a number of geographic locations for the user to choose from.

10. A system including memory and one or more processors operable to execute instructions stored in the memory, wherein the instructions, when executed by the one or more processors cause the one or more processors to:
receive, from a mobile device, first location data associated with an indicated geographic location of the mobile device;
identify, using the one or more processors, in at least one database a first association between a first point of interest (POI) and the first location data;
when a user input correlates the first POI with the indicated geographic location, confirm, using the one or more processors, the first association between the first POI and the first location data as a correctly identified association;
when the user input correlates the first POI with second location data distinct from the first location data, add in the at least one database a second association between the first POI and the second location data, the first location data and the second location data are based on two different sources;
receive a request from a user for information relating to the location of the first POI; and
provide for display to the user, using the one or more processors and based on the confirmation or the addition, the first POI on a map.

11. The system of claim 10, wherein the user input is indicative of a likely visit to the first POI.

12. The system of claim 11, wherein the user input comprises a directional locational query to the first POI.

13. The system of claim 12, wherein the user input is received from a user of the mobile device and further comprises confirmation by an additional user action associated with the first POI.

14. The system of claim 13, wherein the additional user action associated with the first POI includes a post related to the first POI, the post occurring after the directional locational query.

15. The system of claim 13, wherein the additional user action associated with the first POI includes at least one of an Internet search or an Internet navigation event related to the first POI by the user of the mobile device.

16. The system of claim 10, wherein the first POI is an identifier for a physical position in a building.

17. The system of claim 10, wherein the instructions further cause the one or more processors to provide a user at a geographic location with an option to verify that the user is at the geographic location.

18. The system of claim 17, wherein the instructions further cause the one or more processors to provide the user with a list of selectable options, the list including a number of geographic locations for the user to choose from.

* * * * *